Feb. 27, 1940.　　　　K. C. BUGG　　　　2,191,877
COUNTING MECHANISM
Filed June 11, 1936　　　6 Sheets-Sheet 1

Inventor
Kenly C. Bugg
by Rippey & Cassidy
His Attorneys

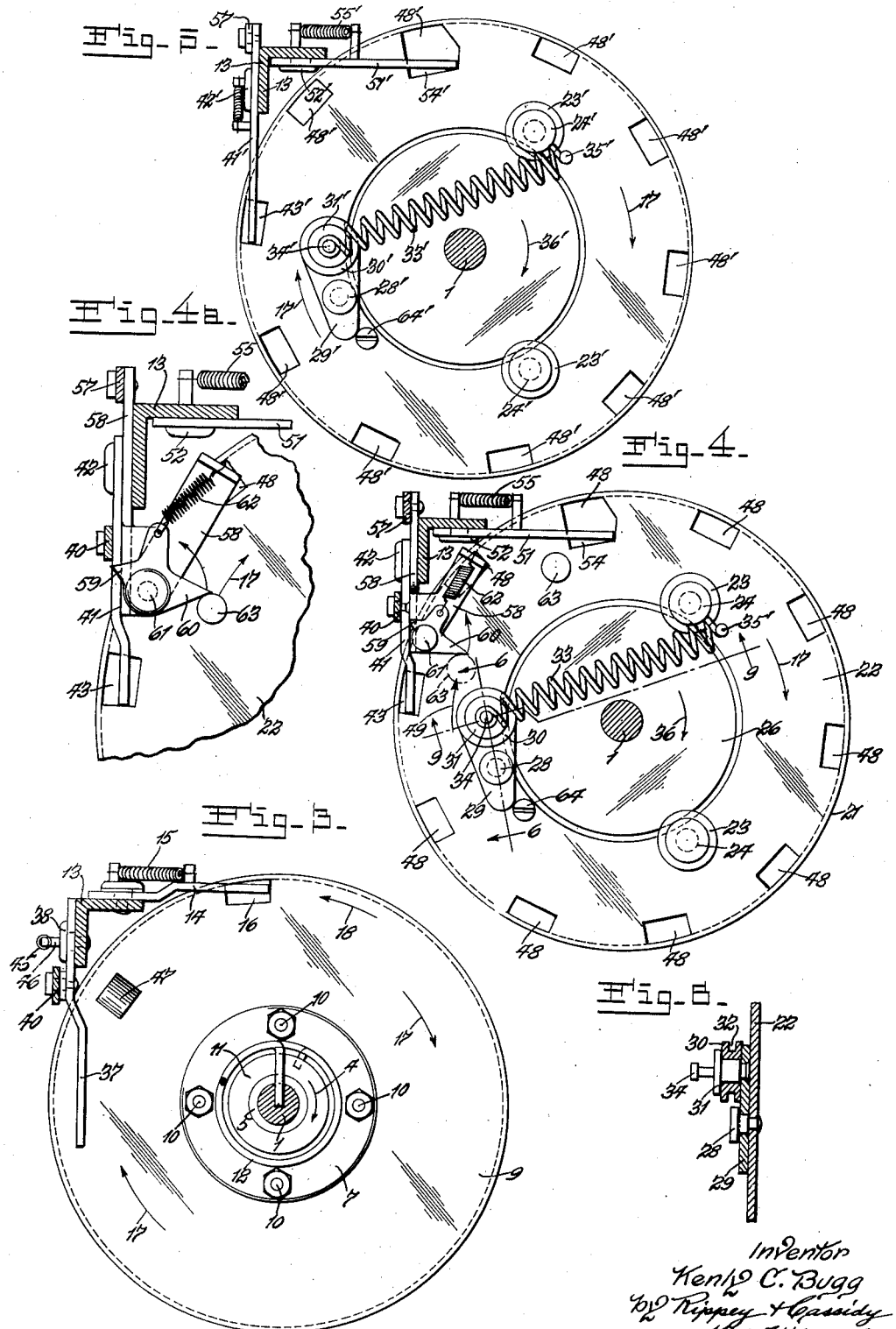

Feb. 27, 1940. K. C. BUGG 2,191,877
COUNTING MECHANISM
Filed June 11, 1936 6 Sheets-Sheet 3
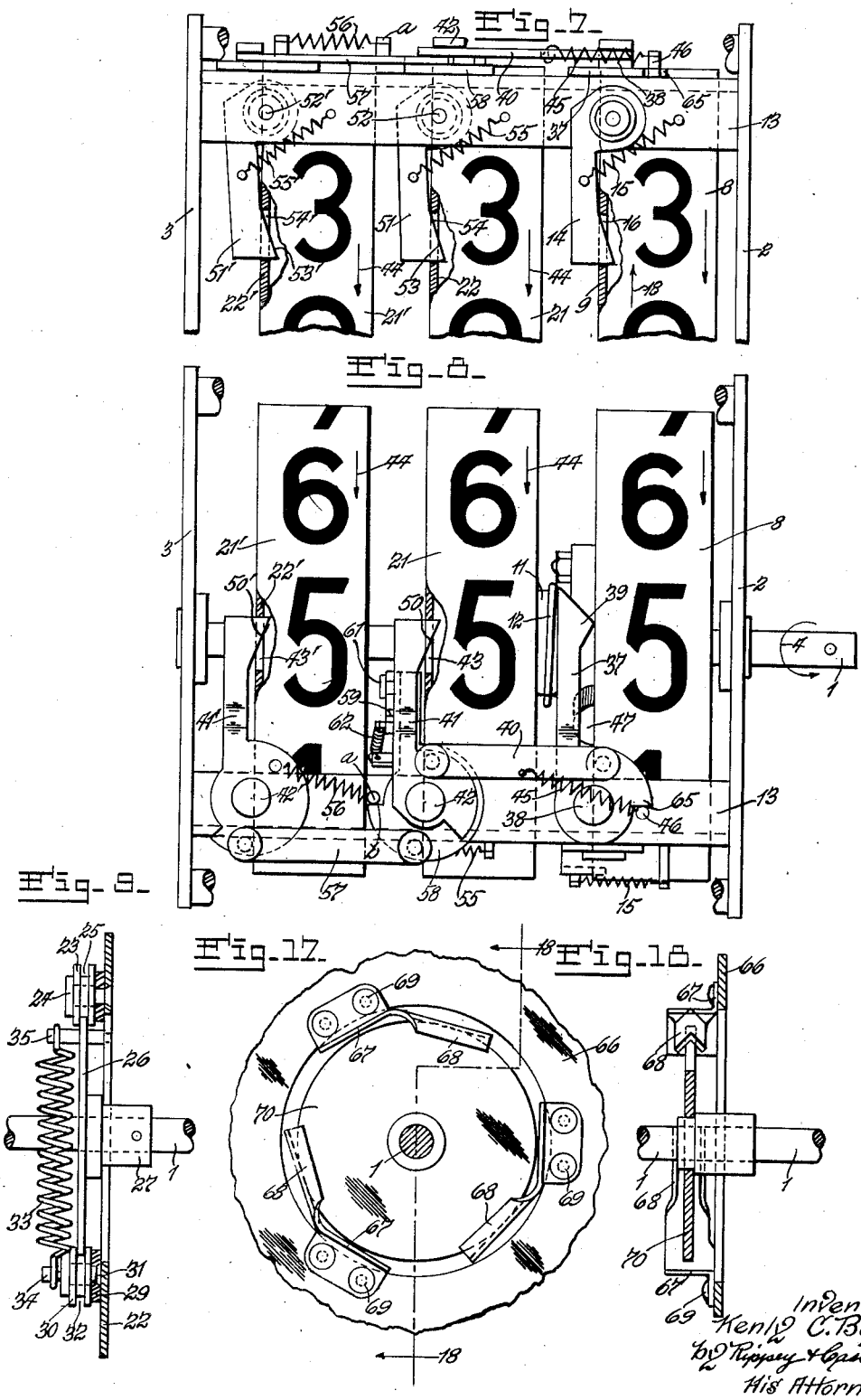

Feb. 27, 1940. K. C. BUGG 2,191,877
COUNTING MECHANISM
Filed June 11, 1936 6 Sheets-Sheet 4
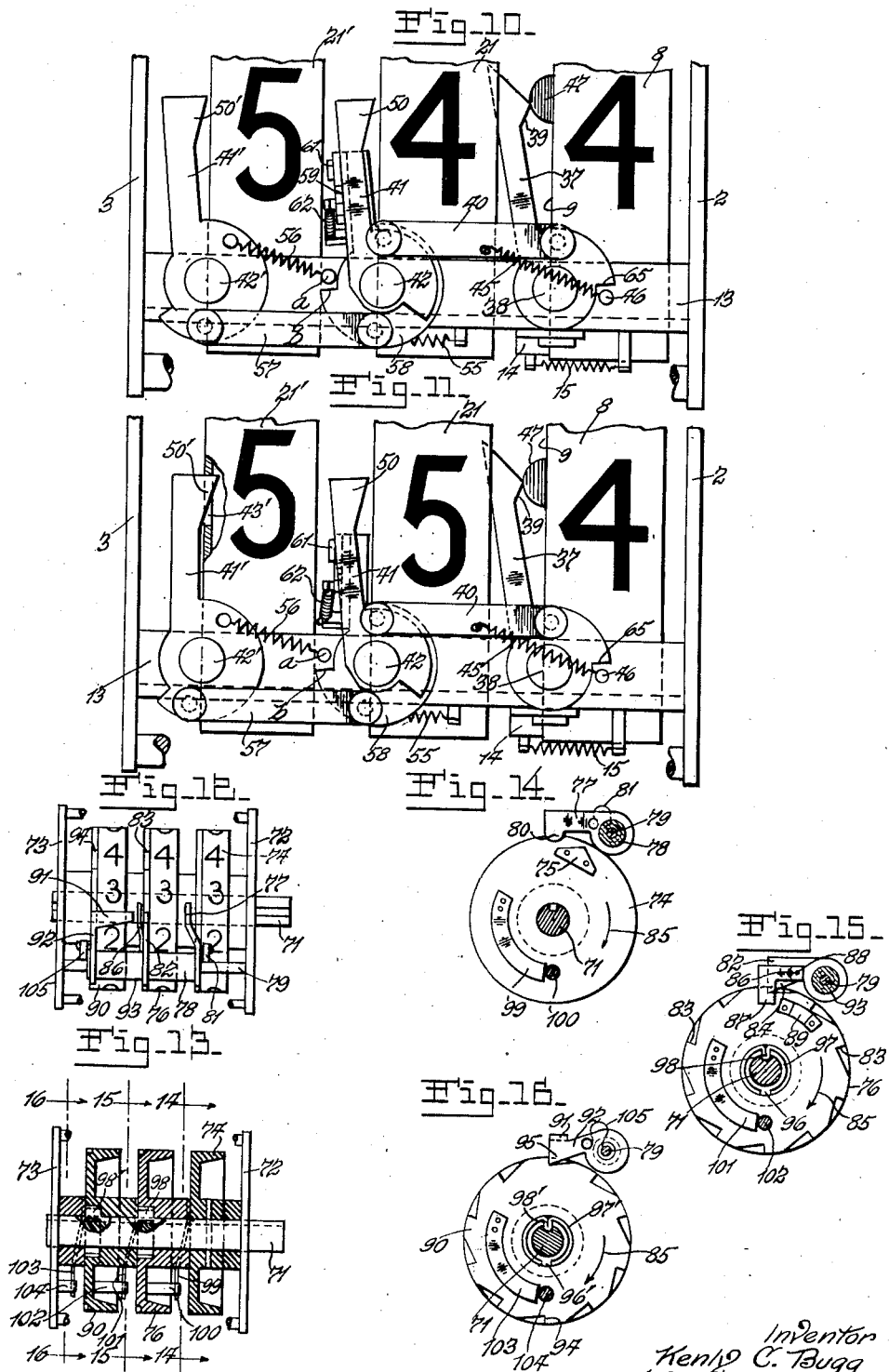

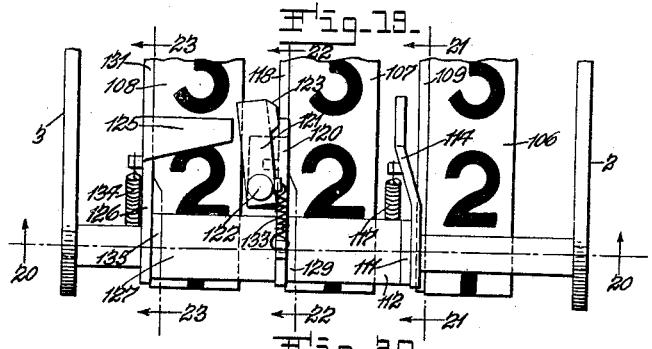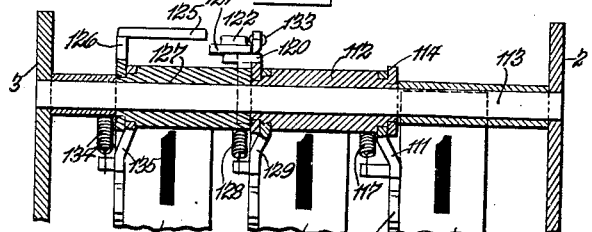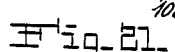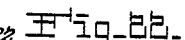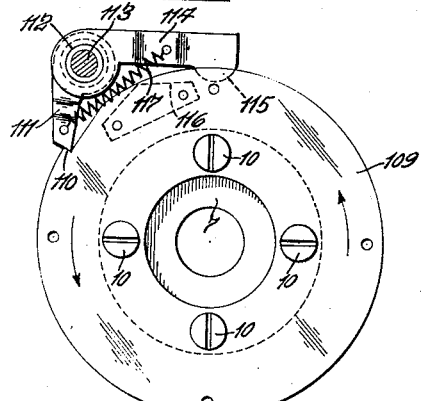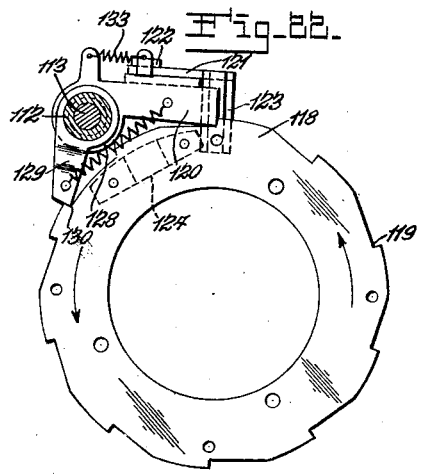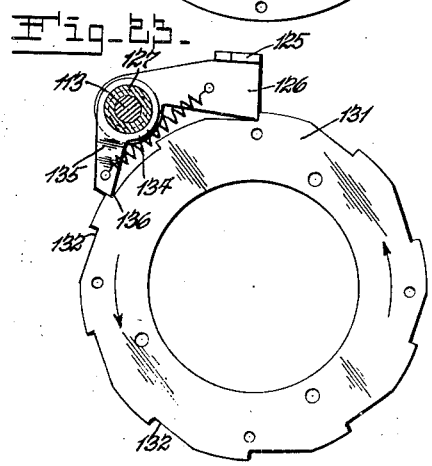

Feb. 27, 1940.   K. C. BUGG   2,191,877
COUNTING MECHANISM
Filed June 11, 1936   6 Sheets-Sheet 6

Inventor:
Kenly C. Bugg
by Hoguet Neary & Campbell
Attorneys

Patented Feb. 27, 1940

2,191,877

UNITED STATES PATENT OFFICE 2,191,877

COUNTING MECHANISM

Kenly C. Bugg, Farmington, Mo., assignor to Neptune Meter Company, a corporation of New Jersey Application June 11, 1936, Serial No. 84,659

15 Claims. (Cl. 235—134)

This invention relates to counting mechanism.

Objects of the invention are to provide an improved counting mechanism having a series of indicating or registering elements arranged in denominational orders and mounted for rotation with and about a shaft adapted to be rotated; to provide a frictional device for rotating the units indicating or registering element when said shaft is rotated in one direction, and a member for holding and preventing rotation of the remaining indicating or registering elements until said units element begins turning from its "9" position to its "0" position; to provide devices under control of the units element for releasing said member from the tens element when, or about the time that, the units element reaches its "9" position, and frictional supporting and actuating means supported in part by said shaft and in part by the tens counting element for supporting and rotating the tens counting element one step around said shaft in a transferring operation while said units counting element passes from "9" to "0" position; and to provide releasing means under control of the tens counting element, and other elements in the respective higher denominational orders for releasing the higher denominational elements to permit transfer from lower to higher denominational orders with accuracy and precision, by frictional supporting and actuating means like and supported the same as the said means for the tens counting element.

Another object of the invention is to provide an improved counting mechanism of the species herein disclosed utilizing frictional driving devices for rotating the denominational elements in transferring from lower to higher denominational orders, and dispensing with the use of the usual Geneva gear or analogous devices heretofore used in many counters and registers of the class to which the present invention relates.

Another object of the invention is to provide cooperating frictional devices supported in part by the operating shaft for rotating said elements in one direction in counting operations, and in the opposite direction in clearing operations, which is to say resetting them in zero positions, when the shaft is rotated in said opposite direction from the direction in which it is rotated in counting operations.

Various other objects and advantages of the invention will be readily apparent from the following description, reference being made to the annexed drawings, in which—

Fig. 3 is a vertical cross-sectional view approximately on the line 3—3 of Fig. 2, showing the units counting element and cooperating devices.

Fig. 4 is a cross-sectional view on the line 4—4 of Fig. 2, showing the tens counting element and the frictional devices for operating the same, as well as the devices controlled thereby for releasing the hundreds counting element for a transfer operation.

Fig. 4a is an enlarged view showing the devices controlled by the tens counting element and the frictional devices for releasing the hundreds counting element for a transfer operation.

Fig. 5 is a sectional view approximately on the line 5—5 of Fig. 2, showing the hundreds counting element and cooperating devices.

Fig. 6 is a sectional view on the line 6—6 of Fig. 4.

Fig. 7 is a view showing the counting elements and the detents for stopping them in their clear or zero positions when they are rotated in the direction opposite from that in which they are rotated in counting operations.

Fig. 8 is a view showing the mechanism under control of the units counting element for releasing the tens counting element for a transfer operation, and also showing the mechanism for releasing the hundreds counting element for a transfer operation.

Fig. 9 is a sectional view of one of the counting elements on the line 9—9 of Fig. 4.

Fig. 10 is a view showing the position of the parts when the units counting element transfers to the tens counting element and the tens counting element transfers to the hundreds counting element.

Fig. 11 is a similar view showing the position of the parts in transferring from units to tens.

Fig. 12 is an elevation of a counting and registering mechanism of a modified construction.

Fig. 13 is a longitudinal sectional view of the mechanism that is shown in Fig. 12.

Figs. 14, 15 and 16 are transverse sectional views on the lines 14—14, 15—15 and 16—16, respectively, of Fig. 13.

Fig. 17 (sheet 3) is a view showing an alternative form of frictional supporting and actuating means for the counting elements above units denominational order.

Fig. 18 is a sectional view on the line 18—18 of Fig. 17.

Fig. 19 is a plan view showing an alternative arrangement of the detents controlling transferring and clearing operations of the counting elements.

Fig. 20 is a sectional view approximately on the line 20—20 of Fig. 19.

Figs. 21, 22 and 23 are sectional views approximately on the similarly numbered section lines respectively in Fig. 19.

Figure 24:
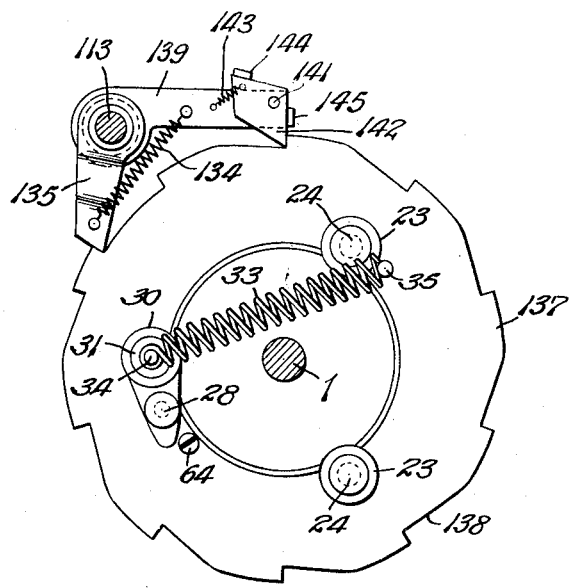

Fig. 24 is a view showing a portion of a counting element and the detent device engaged therewith and designed specially for use in mechanisms requiring rapid operation.

Figure 25:
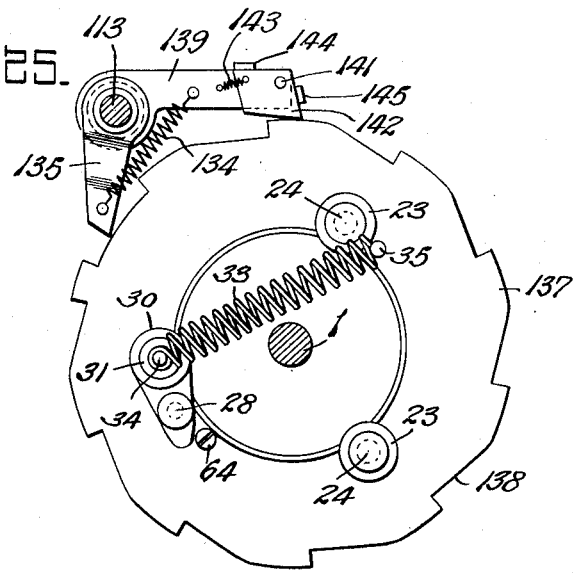

Fig. 25 is a similar view showing the detent device disengaged from the counting element.

As illustrated in Figs. 1 to 11, inclusive, the shaft 1 is rotatively mounted in supports 2 and 3 and rotates in the direction of the arrows 4 (Figs. 1 and 2) when it is rotated in counting or registering operations. Said shaft may be rotated by various devices or mechanisms which are not herein shown or described because illustration and description thereof are unnecessary for an understanding of this invention.

Between the supports 2 and 3 a sleeve 5 is attached on the shaft 1 so that said sleeve 5 is always rotated when said shaft 1 is rotated. A circumferential flange 6 is formed on the sleeve 5 and constitutes one member of a locking clutch when the shaft 1 is turned in the direction of the arrow 4, and a sliding or slipping clutch member when the shaft 1 is turned in the opposite direction.

An annular friction member 7 at the side of the flange 6 that is toward the support 3 is attached to a units counting or registering element comprising an annular portion 8 and an inwardly extended portion 9 by detachable and replaceable fasteners 10 passing through the inwardly extended portion 9 and the member 7 and securing them in rigid relationship. The friction member 7 is loose enough upon the sleeve 5 so that said sleeve 5 is rotative with respect to the friction member 7 and the units counting element 8 when the units counting element is held in its clear or zero position and the shaft 1 is rotated in the reverse direction from the arrow 4 in an operation to clear and reset all counting elements in their clear or zero positions. A nut 11 is screwed on the threaded portion of the sleeve 5 adjacent to the friction member 7. A coiled spring 12 has one end attached to the nut 11 and the opposite end attached to the shaft 1 (Figs. 2 and 3), and the energy of said spring is exerted to screw the nut 11 on and along the threaded portion of the sleeve 5 and thereby hold the nut 11 in frictional contact with the member 7. This frictional contact between the member 7 and the nut 11 is enough to prevent any appreciable or objectionable relative movements between the shaft 1 and the units counting element 8 when the shaft 1 is turned in the direction of the arrow 4. However, when the units counting element 8 is in its zero or clear position and is held or locked against reverse rotation, the shaft 1 may be rotated in the reverse direction, which is the direction opposite from that indicated by the arrow 4 while the units counting element is held stationary and the counting elements in the respective higher denominational orders are turned to their clear or zero positions. This is because the threads on the sleeve 5 run from the end of said sleeve toward the member 7 so that, when the shaft 1 and sleeve 5 are turned in the direction of the arrow 4, the energy of said spring is utilized to hold the nut 11 from turning with said sleeve 5 and thereby to screw said nut 11 toward and against the member 7; and, when the shaft 1 and sleeve 5 are turned in the opposite direction, the nut 11 will be released and loosened from clamping engagement with the member 7. This slight loosening of the nut 11 is enough to permit continued reverse turning of the shaft 1 while the units counting element continues to be held stationary.

Figure 1:
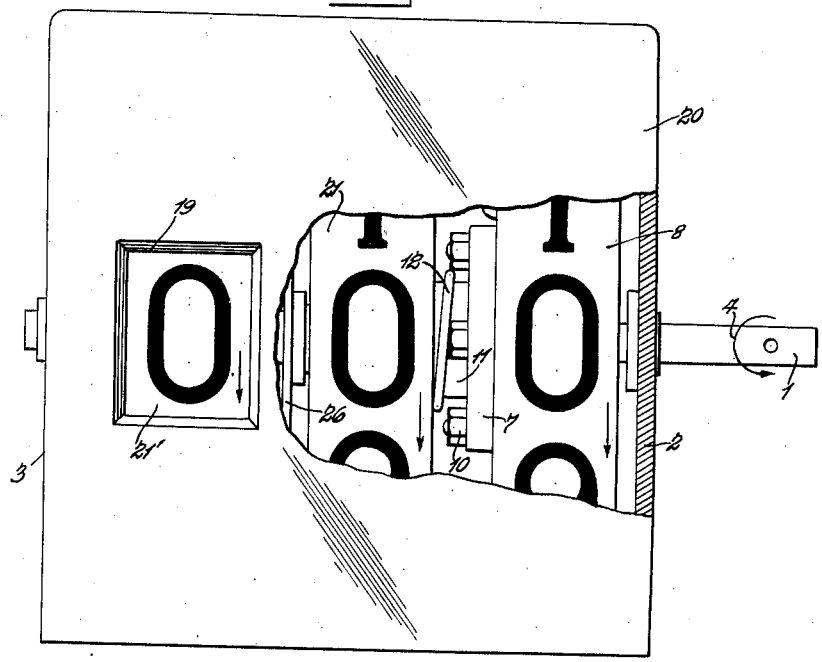
Fig. 1 is a front elevation of the casing or housing in which the invention is enclosed, a part of the casing or housing being broken away to disclose parts of the invention.
Figure 2:
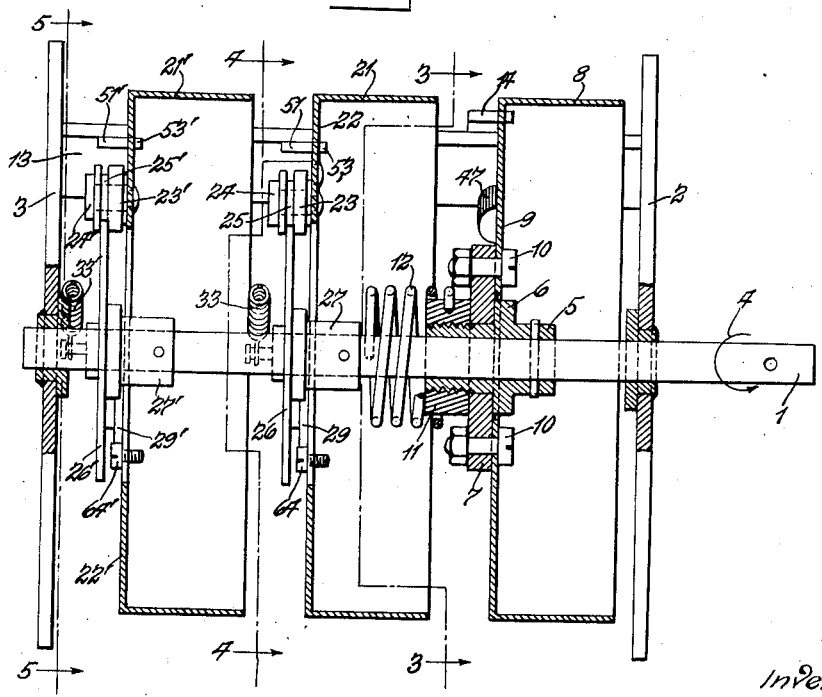
Fig. 2 is a longitudinal sectional view of one embodiment of the counter and registering mechanism.

An angle bar frame member 13 is rigidly attached to the supports 2 and 3. A detent 14 has one end pivotally supported by the bar 13 and the opposite end pressed against the part 9 of the units counting element by a spring 15 having one end connected with said detent and the opposite end attached to the bar 13 (Fig. 3). The part 9 of the units counting element is formed with a hole 16 into which the free end of the detent 14 will be drawn and held by the spring 15 when the units counting element is in its clear or zero position. When the shaft 1 is turned in the direction of the arrow 4 in counting or registering operations, the units counting element is turned therewith, as indicated by the arrows 17 (Fig. 3) and the free end of the detent 14 will become disengaged from within the hole 16 and will press against the surface of the part 9 of the units counting element. When the shaft 1 is turned in the opposite direction from that indicated by the arrow 4, the units counting element will be turned therewith in the direction of the arrow 18 (Figs. 3 and 7) until the detent 14 engages in and abuts against the end wall of the hole 16 and stops further reverse rotation of the units counting element. The relationship of the parts is such that the units counting element is stopped by the detent 14 from reverse rotation when said units counting element is in its clear or zero position, in which position the units counting element is shown in Fig. 1 of the drawings.

The periphery of the units counting element has thereon all of the digits from "0" through "1" to "9", and these digits are moved opposite and across the sight openings or slots 19 in an appropriate housing or casing 20 during counting operations. When all of the counting elements are in their clear or zero positions, each of said counting elements presents "0" at or opposite said sight openings 19.

In the form of the invention shown in Figs. 1 to 11, inclusive, all of the counting elements in higher denominational orders are supported and operated by like frictional supporting and operating devices. In the present case, and to afford a sufficient understanding of the invention, I have illustrated only units, tens and hundreds counting elements, which are capable of counting or registering as high as "999". In the drawings I have applied to the parts of the hundreds counting element that are analogous to parts of the tens counting element the same reference numerals that are applied to the parts of the tens counting element, with the addition of exponents.

The tens annular counting element 21 is like the annular units counting element 8 and is provided with similar peripherally displayed digits, and has an inwardly extended portion 22. A pair of rollers 23 are rotatively supported on axle studs 24 attached to and projecting from the portion 22 parallel with the axis of the shaft 1. Each roller 23 is formed with a circumferential groove 25 receiving the margin of a disc 26 that is rigid with a hub 27 which is rigidly secured on the shaft 1. The axes of the rollers 23 are approximately 120° apart more or less (Fig. 4).

A pivot 28 attached to the portion 22 of the counting element 21 supports a lever 29. A roller 30 is rotative on an axle 31 attached to the lever 29 and has a circumferential groove 32. This roller 30 is a duplicate of the rollers 23 and is circumferentially spaced approximately 120° more or less from each of said rollers 23. The groove 32 receives the peripheral margin of the disc 26. A spring 33 has one end connected with an extension 34 of the axle 31 and the opposite end connected with a pin 35 attached to and projecting from the portion 22 between the rollers 23 so that said spring holds the roller 30 in close engagement with the disc 26. Obviously (Fig. 4) these devices support the tens counting element 21 exactly or approximately coaxial with the shaft 1 and in axial alinement with the units counting element 8. The two rollers 23 and the roller 30 clampingly or frictionally engage the periphery of the disc 26 with sufficient force or pressure to turn the counting element 21 by said disc when the shaft 1 is rotated in the direction of the arrow 36 (Fig. 4) unless the counting element 21 is positively held against such turning. In the present invention, turning of the counting element 21 in the direction of the arrow 36 is positively prevented until the units counting element 8 starts to pass from "9" to "0" and permits a transfer turning movement of the tens counting element 21 one digit step which, in the present instance, is an advance equal to one-tenth of a revolution of said tens counting element.

A lever 37 (Fig. 8) has one end mounted on a pivot 38 supported by the bar 13 and on its opposite end has a cam 39 pressing against the portion 9 of the units counting element. A link 40 has one end pivoted to the lever 37 and the opposite end pivoted to a detent 41 having one end mounted on a pivot 42 supported by the bar 13 and the opposite end engaging the portion 22 of the tens counting element. In zero or clear position, the free end of the detent 41 engages in a hole 43 (Figs. 4 and 8) and positively prevents turning of the tens counting element 21 in the direction of the arrows 44 (Fig. 8) which is the direction in which all of the counting elements turn when they are operated in counting and transferring operations respectively. A spring 45 having one end engaged with the link 40 and the opposite end engaged with a stud 46 projecting from the bar 13 holds the cam 39 of the lever 37 and the end portion of the detent 41 against the portions 9 and 22 of the units and tens counting elements respectively. When the tens counting element is in its zero or clear position (Fig. 1), the detent 41 is engaged in the hole 43 (Figs. 4 and 8).

A cam 47 is supported by the portion 9 of the units counting element in position to move against the cam 39 and thereby swing the lever 37 toward the tens counting element when the units counting element reaches its "9" position and, in passing from "9" position to "0" position, requires a transfer operation of the tens counting element in order to count or register the correct amount. When the lever 37 is moved away from the units counting element by the cam 47 during rotation of the shaft 1 in the direction of the arrow 4, the link 40 disengages the detent 41 from the hole 43 and the frictional supporting and operating devices 23, 26 and 30 that support the tens counting element will turn or advance the tens counting element one digital step. The relationship of the cams 39 and 47 is such that the detent 41 is released from the tens counting element at the proper time so that said tens counting element in its transfer movement may turn in synchronism with the units counting element while the units counting element is turning from "9" position to "0" position.

When the tens counting element is advanced or turned one digital step from zero position, the detent 41 becomes engaged in the next adjacent one of an annular series of nine additional holes 48 one of which is provided for each of the digits from "1" to "9", the hole 43 being provided for "0". Thus (Fig. 4) when the tens counting element advances in the direction of the arrow 49 from "0" position to "1" position, the detent 41 will engage in the next adjacent hole 48 and will stop and prevent further rotation of the tens counting element until another transfer operation from units to tens is required, whereupon the operation is repeated, and so on, successively.

In order to clear or reset the counting elements in their zero positions, the shaft 1 is rotated in the opposite direction from that indicated by the arrow 4, as before mentioned. This reverse rotation of the shaft 1 rotates therewith the disc 26 which cooperates with the rollers 23 and 30 to support and rotate the tens counting element. When the tens counting element is rotated reversely from the arrow 49, the detent 41 will not prevent such rotation, due to the cam-like formation 50 at the free end thereof. In order to stop the tens counting element in its clear or zero position, I provide a detent 51 mounted on a pivot 52 supported by the bar 13 and having a cam-like end 53 adapted to engage in a widened portion 54 of one of the holes 48 when said widened portion 54 is opposite said cam-like end 53 of said detent 51 (Figs. 4 and 7). A spring 55 holds the cam 53 of the detent 51 in engagement with the tens counting element so that the cam end 53 of said detent 51 will be immediately engaged in the hole 54 when said hole 54 is at said cam end 53 and in position for such engagement thereby. This occurs at the same time that the cam end 50 of the detent 41 engages in the hole 43. This is at the time that the tens counting element is in its clear or zero position and the detent 51 will positively prevent further reverse rotation of the tens counting element. It will be observed that, due to the frictional supporting and operating devices for the units and tens counting elements, said counting elements will be rotated simultaneously in clearing operations until one or the other is stopped while the other counting element continues to rotate toward its clear or zero position, if different digits were indicated by said counting elements.

The detent 41' for the hundreds counting element 21' is actuated by a spring 56 to hold the cam end 50' thereof in cooperative relation to the portion 22'. A link 57 has one end pivoted to the detent 41' and the opposite end pivoted to a lever 58 mounted for swinging movements on the pivot 42. A lever comprising an outwardly extended arm 59 and an inwardly extended arm 60 is supported on a pivot 61 attached to the lever 58. One end of the spring 56 is connected with the detent 41' and the opposite end of said spring is attached to a stud $a$ (Fig. 8) projecting from the bar 13 in position to be engaged by a shoulder $b$ on the lever 58 to limit extent of movement of said lever 58 toward tens counting element and prevent said lever 58 from moving the lever arm 59 under the detent 41. A spring 62 (Fig. 4a) connecting said lever 59—60 with the lever 58 holds the arm 59 out of the way of the detent 41 so that said detent 41 may move freely away from the tens counting element until transfer from the tens counting element to the hundreds counting element is required, which is when the tens counting element is moved from "9" position to "0" position in a transferring operation from units counting element to tens counting element. A lug 63 projecting from the portion 22 of the tens counting element engages the lever arm 60 and thereby moves the lever arm 59 across the edge of the detent 41 when the tens counting element is moved to its "9" position and holds the arm 59 across the edge of the detent 41 so long as the tens counting element remains in its "9" position. Assuming that the tens counting element is in its "9" position and a transfer from units to tens is taking place: The cams 39 and 47 will swing the lever 37 toward the tens counting element, thereby causing the link 40 to swing the detent 41 out of engagement with the tens counting element. Because the arm 59 is at the side of the link 41, said link 41 will engage said arm 59 and thereby swing the lever 58 about its pivot and cause the link 57 to disengage the cam portion 50' of the detent 41' from the hole 43' in the hundreds counting element and permit the frictional supporting and actuating devices for the hundreds counting element to turn said hundreds counting element one digital step in a transfer operation, whereupon the end 50' of the detent 41' will engage in one of the holes 43' and stop further rotation of the hundreds counting element until another transfer operation of the hundreds counting element is required.

A stud 64 (Fig. 4) projecting from the part 22 in position to be engaged by the free end of the lever 29 will positively prevent swinging movement of said lever 29 far enough in a direction to disengage the roller 30 from the disc 26, even when the device is subjected to comparatively rough treatment, as in shipping. Said stud 64 does not function as an abutment to hold the roller 30 tight against the disc 26, but does prevent swinging movement of the lever 29 far enough to disengage the roller 30 from the disc 26 and leaves it to the spring 33 to hold the roller 30 against the disc 26.

The stud 46 is in position to be engaged by a shoulder 65 (Fig. 8) on the lever 37 and will hold the lever 37 and thereby the detent 41, as well as the detent 41', in their properly extended positions for assembly in the device.

In the modification shown in Figs. 17 and 18, the counting elements in the higher denominational orders are supported and actuated by a specifically different form of frictional supporting and actuating means. The inwardly extended portion 66 of each counting element above units denominational order has attached thereto a series of springs each comprising an attaching portion 67 and an arcuate or V-shaped portion 68. The attaching portions 67 are secured to the counting elements 66 by fasteners 69 while the arcuate or V-shaped portions 68 receive and press against the periphery of a disc 70. It is apparent that these springs, when properly formed and assembled in connection with the inwardly extended portion 66 of a counting element and mounted on the disc 70, will support the counting element concentrically with the operating shaft 1 in a manner analogous to that in which the rollers 23 and 30 support the counting element concentrically with the shaft 1; and it is further obvious that, at the proper time, the respective counting elements in higher denominational orders may be turned in transferring operations, assuming that the same transfer mechanism as that already described is used in connection therewith.

The variation of the invention shown in Figs. 12 to 16, inclusive, is a highly simplified device of considerably reduced dimensions and may be conveniently used in places in which the larger devices may not be used satisfactorily.

As shown, a shaft 71 is mounted for rotation in supports 72 and 73 which may be rigid frame members. A units counting element 74 is rigidly attached to the shaft 71 and always rotates with said shaft when said shaft is rotated. The units counting element has on its periphery in equally spaced relationship all of the digits and, in its clear position, presents "0" opposite a sight slot or opening in the housing or casing like the sight slot 19. A cam 75 is attached to the side of the counting element 74 that is toward the tens counting element 76. A lever 77 (Fig. 14) is attached to a sleeve 78 rotative on a shaft 79 attached to the supports 72 and 73. A cam 80 on the free end of the lever 77 extends adjacent to the units counting element 74 in position so that, when the units counting element reaches its "9" position, the cam 75 will be engaged by the cam 80 and the lever 77 will be moved in opposition to a spring 81. One end of the spring 81 is attached to the lever 77, and the opposite end is attached to the shaft 79, and the energy of said spring is exerted to move the free end of the lever 77 inwardly or toward the shaft 71.

A detent 82 is attached to the opposite end of the sleeve 78. A series of ten notches 83 are formed in the periphery of the tens counting element 76 at the left side or end thereof, and said notches are adapted to receive successively a cam end 84 of the detent 82. The end walls of said notches constitute abutments to cooperate with the detent 82 to prevent the tens counting element from turning constantly with the shaft 71 and with the units counting element 74. However, as before mentioned, when the units counting element passes from "9" position to "0" position, a transfer operation of the tens counting element is required. The cam 75 had moved the lever 77 outwardly and had thereby turned the sleeve 78 to which the detent 82 is attached. This turning movement of the sleeve 78 had disengaged the cam end 84 of the detent 82 from the notch 83 in which said cam was seated, and a single digital step turning movement of the tens counting element is permitted, as required in transferring. Before the units counting element reaches its zero position in this transferring operation, the cam 75 passes beyond the cam 80, and the spring 81 quickly moves the arm 77 inwardly, thereby turning the sleeve 78 and engaging the cam end 84 of the detent 82 in the next digital notch 83, to prevent further turning of the tens counting element until another transfer operation thereof is required. In their counting and transferring operations, the units counting element (Fig. 14), the tens counting element (Fig. 15), and the hundreds counting element (Fig. 16) turn in the direction of the arrows 85.

A leaf spring, comprising an arm 86 and an inwardly extended arm 87, has said arm 86 attached to the detent 82 by a fastener 88. A laterally extended cam 89 is attached to the tens counting element 76 and has its high point toward the hundreds counting element 90. When the tens counting element 76 reaches its "9" position, the cam 89 is engaged by the spring arm 87 and pushes the spring laterally toward the hundreds counting element 90 and under a finger 91 formed in connection with a detent 92 and projecting across and adjacent to the periphery of the hundreds counting element 90 toward the tens counting element. The detent 92 is attached to a sleeve 93 rotatively supported on the shaft 79. A series of ten notches 94 are formed in the periphery of the hundreds counting element 90 at the left side or end thereof, and said notches are adapted to receive successively a cam end 95 of the detent 92. The walls of said notches constitute abutments to cooperate with the detent 92 to prevent the hundreds counting element from turning constantly with the shaft 71, or otherwise, until a transfer from tens to hundreds is required. Transfer from tens to hundreds is required only when the tens counting element passes from "9" to "0" position. When the units and tens counting elements pass from "9" positions to "0" positions in transfer operations from units to tens and from tens to hundreds, the detent 82 is moved to and held in its outward position by the lever 77 actuated by the cams 75 and 80, thereby moving the spring 86, 87 outwardly with the detent 82. When said spring 86, 87 is moved outwardly during movement of the tens counting element from "9" position to "0" position, it is under and engages the finger 91 and moves the detent 92 out of engagement with the hundreds counting element 90 to permit a transfer operation thereof.

The tens counting element 76 and the hundreds counting element 90 are supported for rotation about the shaft 71, and for rotation with said shaft in transferring operations. The counting element 76 has in its hub a circular cavity 96 in which a circular spring 97 is located, said spring having a rebent portion 98 attached to the shaft 71. The spring 97 applies constant pressure against a cylindrical wall of the cavity 96, and said pressure is enough to rotate the tens counting element with the shaft 71 whenever the detent 82 is disengaged from said tens counting element. However, said spring applies only yielding frictional pressure against the cylindrical wall of the tens counting element and will permit the shaft 71 to rotate freely in counting operations without damage to any of the parts. When the detent 82 is disengaged from the tens counting element, said tens counting element will be rotated immediately in synchronism with said shaft 71.

The hundreds counting element 90 has analogous resilient frictional operating means, and the same reference numerals with exponents are applied to the parts thereof as are applied to the parts of the resilient frictional operating means for the tens counting element in Fig. 15.

The units counting element 74 has attached thereto a leaf spring 99 the free end of which extends far enough therefrom and toward the tens counting element 76 to engage a pin 100 projecting from said tens counting element toward the units counting element. The tens counting element has a similar leaf spring 101 attached thereto and projecting far enough toward the hundreds counting element to engage a pin 102 projecting from the hundreds counting element toward the tens counting element; and the hundreds counting element has a similar leaf spring 103 attached thereto and projecting therefrom far enough toward the support 73 to engage a pin 104 attached to said support and projecting toward the hundreds counting element.

In counting operations, when the counting elements are turned in the direction of the arrows 85 in their respective counting and transferring movements, the springs 99, 101 and 103 will rub against the ends of the pins 100, 102 and 104, respectively, and escape therefrom without objectionably or substantially retarding the turning movements of said counting elements. To clear and restore the counting elements to their zero positions, the shaft 71 is turned in the opposite direction from that indicated by the arrows 85. This causes the ends of the springs 99, 101 and 103 to engage or abut against the pins 100, 102 and 104, respectively, and stop the counting elements in their clear or zero positions. Thus, when the spring 103 abuts against the pin 104 in a reverse turning or clearing movement of the hundreds counting element 90, said counting element 90 is thereby positively stopped in its zero position and cannot be turned further in a reverse direction. After the hundreds counting element has been positively stopped as aforesaid, abutment of the end of the spring 101 against the pin 102 will positively stop and prevent further reverse turning movement of the tens counting element 76, after which abutment of the end of the spring 99 against the pin 100 will positively stop and prevent further reverse turning movement of the units counting element 74. When thus positively stopped, all of said counting elements are in their clear or zero positions.

When the tens counting element 76 is in its clear or zero position, the cam 84 of the detent 82 is engaged in one of the notches 83. Likewise, when the hundreds counting element 90 is in its clear or zero position, the cam 95 of the detent 92 is held in one of the notches 94 by a spring 105 (Fig. 16).

It should now be clear that the embodiment of the invention illustrated in Figs. 12 to 16, inclusive, is of relatively reduced dimensions in comparison with the dimensions of the device illustrated in the preceding views of the drawings and may be mounted and used in places where larger devices cannot conveniently be mounted and used. The foregoing description of this modified embodiment of the invention includes a description of the operation thereof so that repetition of the operation appears unnecessary.

In the modification shown in Figs. 19 to 23, inclusive, the units counting element 106, the tens counting element 107, and the hundreds counting element 108 are mounted in axial alinement upon a shaft analogous to the shaft 1 and have equally spaced on their peripheries all of the ten digits. The units counting element has attached thereto on the side toward the tens counting element a disc 109 provided in its periphery with a single notch 110 adapted to receive the zero stop detent 111, which will stop the units counting element in its zero or clear position when said counting element is turned in the reverse direction by its supporting shaft, such as the shaft 1. The detent 111 is pivoted on a sleeve 112 mounted on a shaft 113. A lever 114 is attached to the sleeve 112 and has on its free end a cam 115. A cam 116 attached to the disc 109 will operate against the cam 115 during movement of the units counting element 106 from its "8" position to its "9" position, and will swing the lever 114 outwardly in opposition to a spring 117 connecting said lever 114 with the detent 111 (Fig. 21), and will support said lever 114 in its outward position so long as the units pinion remains in its "9" position. This outward movement of the lever 114 will turn the sleeve 112 a slight distance about the shaft 113 in order to release the tens counting element preparatory for a transfer movement when the units counting element passes from "9" position to "0" position, as will now be explained.

The tens counting element 107 has attached thereto an annular member 118 provided in its periphery with a series of ten equally spaced notches 119 corresponding to the respective ten digits on the periphery of said tens counting element 107. A detent 120 is attached to the sleeve 112 and engages successively in the respective ten notches 119 to prevent the tens counting element from turning with the supporting shaft and with the units counting element until a transfer operation is required. When the sleeve 112 is turned by operation of the lever 114 by the cam 116, as before described, the detent 120 is disengaged from any notch 119 in which it is seated, permitting the frictional supporting and actuating means for the tens counting element, such as that described in connection with Figs. 1 to 11, inclusive, to turn the tens counting element one digital step to complete a transfer operation during movement of the units counting element 106 from "9" position to "0" position. When the units counting element 106 moves from "9" position to "0" position, the cam 116 moves from engagement with the cam 115 and permits the spring 117 to swing the lever 114 inwardly to its initial position, thereby turning the sleeve 112 slightly to engage the detent 120 with the periphery of the member 118 so that said detent 120 will become seated in the next succeeding notch 119, and thereby stop further turning movement of the tens counting element 107 after said tens counting element has been turned one digital step. In the "9" position of the units counting element, the high point of the cam 116 engages the high point of the cam 115. During turning movement of the units counting element from "9" position to "0" position in the direction of the arrows (Fig. 21), the cam 116 is carried beyond and out of engagement with the cam 115; and, during the same turning movement of the units counting element from "9" to "0", the tens counting element is turned one digital step.

A lever 121 has one end mounted on a pivot 122 supported by the tens detent 120, and has an inwardly extended finger 123 at the side of the member 118. When the tens counting element passes from "8" position to "9" position, a cam 124 attached to the member 118 operates against the finger 123 and swings the lever 121 away from the tens counting element and toward the hundreds counting element a distance sufficient to place said lever 121 under a finger 125 formed in connection with the hundreds detent 126 attached to a sleeve 127 mounted on the shaft 113. A spring 128 connects the tens detent 120 with a detent 129 pivoted on the sleeve 112 adjacent to said detent 120. It is clear (Fig. 22) that said spring 128 will hold the detent 129 in contact with the periphery of the tens member 118, and that said spring 128 cooperates with the spring 117. The tens member 118 is provided with a zero stop notch 130 in which the detent 129 is engaged when the tens counting element 107 is turned in a reverse direction in a clearing operation and reaches zero position.

When the tens detent 120 is raised by operation of the lever 114 by the cam 116, as described, the lever 121 is also raised or moved outwardly with the detent 120. Assuming that the lever 121 had been moved under the finger 125 by the cam 124, as previously described, it is apparent that outward movement of the tens detent 120 and the lever 121 supported thereby will move the hundreds detent 126 out of engagement with the member 131 that is attached to the hundreds counting element 108. The hundreds counting element 108 has a peripheral series of ten equally spaced notches 132 corresponding to the digits on the periphery of the hundreds counting element. When the hundreds counting element moves one digital space or step, the detent 126 is released from the lever 121 because the cam 124 will have passed beyond the finger 123, and a spring 133 (Figs. 19 and 22) will move the lever 121 out of engagement with the finger 125, whereupon the spring 134 connecting the detent 126 with a detent 135 will draw said detent 126 into the next succeeding peripheral notch 132 and positively stop further turning movement of the hundreds counting element. The detent 135 is a stop detent for engaging in a notch 136 in the periphery of the member 131 to stop the hundreds counting element in its clear or zero position when the supporting shaft, such as the shaft 1, is turned in a direction to effect clearing or resetting of the counting elements, as explained in the description of Figs. 1 to 11, inclusive.

In Figs. 24 and 25, a portion 137 of a counting element above units denominational order is shown and is analogous to either of the elements 118 and 131. The member 137 has in its periphery a series of ten equally spaced notches 138 corresponding to the ten digits on the periphery of the counting element (not shown) to which said member is attached. An arm 139 displaces and is used in substitution for each of the detents 120 and 126 and is similarly mounted and supported and operated. A pawl 140 is mounted on a pivot 141 on the arm 139 and has an appropriately shaped detent portion 142 designed and adapted to engage in the respective notches 138. A spring 143 connects the pawl 140 with the arm 139 and tends to move said pawl from the position shown in Fig. 24 to the position shown in Fig. 25, extent of movement of the pawl 140 by the spring 143 being limited by a projection 144 extending from the pawl 140 over the edge of the arm 139. In this position to which the pawl 140 is moved by the spring 143, the engaging portion 142 of said pawl is outwardly beyond the periphery of the member 137 and is beyond the notch 138 from which it was disengaged, so that it is impossible for said member 137 to engage said pawl until the arm 139 is moved inwardly in the manner in which the detents 120 and 126 are moved inwardly, as before described. When the arm 139 is moved inwardly, the detent end 142 will engage in the next adjacent notch 138.

When a transfer is made from units to tens for instance, the arm 139 is swung outwardly to disengage the pawl 142 from the notch 138 in which it was engaged precisely the same as the detent 120 is swung outwardly from the notch in which it was engaged. When the pawl 140 is disengaged from the member 137 by said outward movement of the arm 139, the spring 143 immediately acts to swing said pawl 140 from the position shown in Fig. 24 to the position shown in Fig. 25. In the position to which the pawl 140 is moved by the spring 143, as shown in Fig. 25, the engaging detent portion 142 of said pawl is beyond the notch 138 in which it had been engaged and cannot again become engaged in the same notch 138. Thus, the tens counting element is immediately conditioned for a transfer operation, and such transfer operation cannot possibly be prevented by the pawl 140, even when the device is operated rapidly. The pawl 140 has a finger 145 extending laterally therefrom across the end of the arm 139 so as to provide an abutment to stop turning movement of the pawl about the pivot 141 by the member 137 when said member 137 is turned in the direction of the arrow thereon.

It should be understood that the supporting and actuating means for the member 137 may be of any embodiment or form herein shown or described, or any other equivalent or satisfactory form and embodiment. The features of the invention shown in Figs. 24 and 25 are of great importance, although briefly illustrated.

From the foregoing, it should be apparent that my invention is capable of embodiment in many forms and may be varied widely within the scope of equivalent limits without departure from the nature and principle thereof.

Having properly illustrated and described my invention, I claim and desire to secure by Letters Patent:

1. A counting mechanism comprising a shaft supported for rotation, a counting element supported for rotation by said shaft, a second counting element of higher denominational order in axial alignment with said first mentioned counting element, means for holding said second counting element from turning with said first mentioned counting element until transfer from the first counting element is required, mechanism controlled by said first mentioned counting element for releasing said holding means from said second counting element, and a frictional actuating device supported by said shaft and supporting said tens counting element in concentric spaced relation with said shaft for rotating said second counting element in a transfer operation when said holding means is released from said second counting element.

2. A counting mechanism comprising a shaft supported for rotation, a units counting element supported by said shaft for rotation thereby, a series of counting elements for successive higher denominational orders in axial alinement with said units counting element, holding means for preventing the respective counting elements above the units denominational order from turning with said units counting element and with said shaft until transfer from the units counting element is required, mechanisms controlled by the units counting element and by the tens counting element respectively for releasing said holding means from the tens counting element and from the hundreds counting element when transfer from the units counting element to the tens counting element and from the tens counting element to the hundreds counting element is required, and frictional actuating devices for the tens counting element and the hundreds counting element respectively supported by said shaft and supporting said elements in concentric spaced relation with said shaft for rotating said tens and hundreds counting elements in transfer operations when said holding means is released therefrom as aforesaid.

3. A counting mechanism comprising a shaft supported for rotation, units and tens counting elements coaxial with said shaft for rotation thereby, means for operatively driving the units counting element from said shaft, a holding device preventing said tens counting element from turning with said shaft until transfer from the units counting element is required, a lever, means for operating said lever by said units counting element before transfer is to be made from the units counting element to the tens counting element, means operated by said lever for releasing said holding device from said tens counting element, and frictional means supporting said tens counting element in concentric spaced relation with said shaft operated by said shaft for turning said tens counting element in a transfer operation when said holding device is released therefrom as aforesaid.

4. A counting mechanism comprising a rotary shaft, a units counting element supported for rotation by said shaft, a tens counting element in axial alinement with said units counting element, a holding device for stopping and holding said tens counting element in the different digital positions to which said tens counting element is turned, mechanism operated by said units counting element for releasing said holding device from said tens counting element for a transfer operation, frictional means supporting said tens counting element in concentric spaced relation with said shaft operated by said shaft for turning said tens counting element a digital step when said holding device is released therefrom as aforesaid, and means for causing said holding device to stop turning movement of said tens counting element after said tens counting element has been turned one digital step in a transfer operation as aforesaid.

5. A counting mechanism comprising a shaft supported for rotation, a units counting element and a series of counting elements for successive higher denominational orders in axial alinement with each other and coaxial with said shaft, means for supporting and turning said units counting element with said shaft, frictional means for supporting and holding said counting elements of higher denominational orders in concentric spaced relation with said shaft for operation by said shaft in transferring operations, detents holding said counting elements of higher denominational orders from turning until a transfer from the next lower adjacent counting element is required, mechanism operated by said units counting element for releasing the detent from the tens counting element for a transfer operation of said tens counting element, and devices operated by said mechansm for releasing the detent from the hundreds counting element when transfer from the tens counting element is required.

6. In a counting mechanism, a counting element in units denominational order, an adjacent counting element in tens denominational order for indicating transfers from units order, a pivoted arm adjacent to tens counting element, a detent pivotally supported by said arm for engaging and holding said tens counting element from turning until a transfer from units counting element is to be made, means controlled by units counting element for operating said arm and disengaging said detent from said tens counting element, and means for moving said detent to position in which it cannot be engaged with said tens counting element to prevent transfer operation thereof irrespective of any movement of said arm.

7. A counting mechanism comprising units, tens and hundreds counting elements, a rotary shaft for rotating the units counting element in counting operations, means carried by said shaft for frictionally supporting said tens and hundreds counting elements for driving movement during transfer operations, detents holding said tens and hundreds counting elements from rotating with said units counting element until transfer to said tens and hundreds counting elements respectively is required, means operated by said units counting element for releasing the detent from said tens counting element for a transfer operation thereof by said frictional means that operates said tens counting element, and means operated by said tens counting element and by said detent therefor for releasing the said detent from said hundreds counting element when a transfer operation thereof is required.

8. A counting mechanism comprising units, tens and hundreds counting elements, a rotary shaft for rotating the units counting element in counting operations, means carried by said shaft for frictionally supporting said tens and hundreds counting elements for driving movement during transfer operations, detents holding said tens and hundreds counting elements from rotating with said units counting element until transfer to said tens and hundreds counting elements respectively is required, means operated by said units counting element for releasing the detent from said tens counting element for a transfer operation thereof by said frictional means that operates said tens counting element, means operated by said tens counting element and by said detent therefor for releasing the said detent from said hundreds counting element when a transfer operation thereof is required, and means whereby said detents will stop said tens and hundreds counting elements respectively in their different digital positions.

9. In a counting mechanism, a rotary shaft, a units counting element supported and rotated by said shaft in counting operations, friction discs attached to said shaft, tens and hundreds counting elements supported and rotated by said discs in concentric spaced relation with said shaft in transfer operations, a detent holding the tens counting element from turning with the units counting element until transfer is required, means operated by said units counting element for releasing said detent from tens counting element when transfer is required from units to tens, a detent holding said hundreds counting element from turning with said tens counting element, and mechanism operated in part by said tens counting element and in part by said detent therefor for releasing said detent from said hundreds counting element when transfer to said hundreds counting element is required.

10. In a counting mechanism, a rotary shaft, a units counting element supported and rotated by said shaft in counting operations, friction discs attached to said shaft, tens and hundreds counting elements supported and rotated by said discs in concentric spaced relation with said shaft in transfer operations, a detent holding the tens counting element from turning with the units counting element until transfer is required, means operated by said units counting element for releasing said detent from tens counting element when transfer is required from units to tens, a detent holding said hundreds counting element from turning with said tens counting element, mechanism operated in part by said tens counting element and in part by said detent therefor for releasing said detent from said hundreds counting element when transfer to said hundreds counting element is required, and means for engaging said detents with said tens and hundreds counting elements respectively to stop said elements after they have been turned one digital step.

11. In a counting mechanism having a shaft and a units counting element rotated thereby in counting operations, a tens counting element having abutments thereon, a lever movable toward and from said tens counting element, a pawl supported by said lever engageable with said abutments respectively to prevent rotation of said tens counting element with said units counting element, means operated by said units counting element for moving said lever to disengage said pawl from said abutments respectively, and a spring for moving said pawl to position beyond the abutment from which it had been disengaged and preventing reengagement of said pawl with said abutment.

12. In a counting mechanism, a units counting element and a plurality of counting elements arranged in successive higher denominational orders in cooperative relation to said units counting element, means for rotating said units counting element in counting and clearing operations, frictional means for supporting said counting elements in concentric spaced relation with shaft and rotating said elements in said higher denominational orders in cooperative relationship to each other and to said units counting element in transferring, detents for holding said counting elements in higher denominational orders from turning with said units counting element until transfer to said higher denominational elements is required, and mechanism controlled by said units element for releasing said detents for operation of said higher denominational elements by said frictional means in transferring, said detents being operative to stop said higher denominational elements respectively when transfer movement thereof is completed.

13. In a counting mechanism, a rotary shaft, a units counting element rotatively supported by said shaft, a tens counting element in axial alinement with said units counting element, a disc attached to and coaxial with said shaft, rollers supported by said tens counting element and engaging the periphery of said disc, means yieldingly holding said rollers in engagement with the periphery of said disc to rotate said tens counting element by said disc, and mechanism controlled by said units counting element controlling step by step rotation of said tens counting element in one direction.

14. In a counting mechanism, a rotary shaft, a units counting element rotatively supported by said shaft, a tens counting element in axial alinement with said units counting element, a disc attached to and coaxial with said shaft, rollers supported by said tens counting element and engaging the periphery of said disc, means yieldingly holding said rollers in engagement with the periphery of said disc to rotate said tens counting element by said disc, mechanism controlled by said units counting element controlling step by step rotation of said tens counting element in one direction, a hundreds counting element, frictional means for rotating said hundreds counting element by said shaft, and devices controlled by said mechanism controlling step by step rotation of said hundreds counting element in one direction.

15. In a counting mechanism, a rotary operating shaft, a series of counting elements including units tens and hundreds, frictional means supported by said shaft and supporting said counting elements in concentric spaced relation with said shaft and rotating said counting elements respectively in counting operations and in transferring operations, and mechanism operated by said units counting element controlling transfer operations of said tens and hundreds counting elements by said frictional means.

KENLY C. BUGG.